US010248941B2

(12) United States Patent
Pavageau et al.

(10) Patent No.: US 10,248,941 B2
(45) Date of Patent: Apr. 2, 2019

(54) SYSTEM AND METHOD FOR THE OPTICAL DETECTION OF INTRUSION, AND CORRESPONDING ELECTRONIC DEVICE, PROGRAM AND RECORDING MEDIUM

(71) Applicant: INGENICO GROUP, Paris (FR)

(72) Inventors: Stephane Pavageau, La Roche de Glun (FR); Andre Carabelli, Saint-Peray (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 15/573,751

(22) PCT Filed: May 9, 2016

(86) PCT No.: PCT/EP2016/060307
§ 371 (c)(1),
(2) Date: Nov. 13, 2017

(87) PCT Pub. No.: WO2016/180767
PCT Pub. Date: Nov. 17, 2016

(65) Prior Publication Data
US 2018/0144330 A1 May 24, 2018

(30) Foreign Application Priority Data

May 12, 2015 (FR) .................................... 15 54265

(51) Int. Cl.
*G06Q 20/20* (2012.01)
*G06F 21/86* (2013.01)
*G06F 21/82* (2013.01)

(52) U.S. Cl.
CPC .......... *G06Q 20/206* (2013.01); *G06F 21/82* (2013.01); *G06F 21/86* (2013.01)

(58) Field of Classification Search
None
See application file for complete search history.

(56) References Cited

U.S. PATENT DOCUMENTS 6,292,898 B1 9/2001 Sutherland
7,813,175 B2 10/2010 Kim
(Continued)

FOREIGN PATENT DOCUMENTS

EP 2232400 A1 9/2010
FR 2909788 A1 6/2008
(Continued)

OTHER PUBLICATIONS

International Search Report and Written Opinion dated Jul. 8, 2016 for corresponding International Application No. PCT/EP2016/060307, filed May 9, 2016.
(Continued)

*Primary Examiner* — Scott A Zare
(74) *Attorney, Agent, or Firm* — David D. Brush; Westman, Champlin & Koehler, P.A.

(57) ABSTRACT

A system for detecting an intrusion in an electronic device. The system includes at least one optical sensor connected to at least one security module of the electronic device. The optical sensor and the security module are configured to detect a variation in light intensity measured by the optical sensor as compared with a reference light intensity associated with at least one pre-determined light source inside the electronic device. The variation in light intensity represents a risk of intrusion into the electronic device.

12 Claims, 3 Drawing Sheets

(56) References Cited

U.S. PATENT DOCUMENTS

| | | | |
|---|---|---|---|
| 8,443,458 B2 | 5/2013 | Lindqvist | |
| 9,323,958 B2* | 4/2016 | Mostovych | G06F 21/86 |
| 2006/0070412 A1* | 4/2006 | Wiseman | E05B 47/0603 |
| | | | 70/88 |
| 2008/0117046 A1 | 5/2008 | Cruzado | |
| 2016/0026275 A1* | 1/2016 | Barrowman | G06F 1/1626 |
| | | | 345/168 |
| 2016/0125181 A1* | 5/2016 | Dai Zovi | G06F 21/36 |
| | | | 726/19 |

FOREIGN PATENT DOCUMENTS

| | | | |
|---|---|---|---|
| FR | 2998695 A1 | 5/2014 | |
| WO | 9940501 A1 | 8/1999 | |

OTHER PUBLICATIONS

French Search Report and Written Opinion dated Mar. 29, 2016 for corresponding French Application No. 1554265, filed May 12, 2015.

International Preliminary Examination Report dated Apr. 25, 2017 for corresponding /international Application No. PCT/EP2016/060307, filed May 9, 2016.

English translation of the International Preliminary Examination Report dated Nov. 13, 2017 for corresponding /International Application No. PCT/EP2016/060307, filed May 9, 2016.

* cited by examiner

SYSTEM AND METHOD FOR THE OPTICAL DETECTION OF INTRUSION, AND CORRESPONDING ELECTRONIC DEVICE, PROGRAM AND RECORDING MEDIUM

CROSS-REFERENCE TO RELATED APPLICATIONS

This Application is a Section 371 National Stage Application of International Application No. PCT/EP2016/060307, filed May 9, 2016, which is incorporated by reference in its entirety and published as WO 2016/180767 A1 on Nov. 17, 2016, not in English.

1. FIELD OF THE INVENTION

The invention relates to the field of the securing of electronic devices such as for example payment terminals to secure the entry of sensitive data (such as the digits of a confidential code entered through their keypad or card data read by a reader) or again independent keypads, independent smart-card or stripe-card readers etc.

2. PRIOR ART

One of the classic forms of attack against an electronic payment terminal consists in spying on the data entered via the keypad (integrated into the electronic payment terminal or independent of the payment terminal and attached to the electronic payment terminal) and especially the digits corresponding for example to a confidential code entered by a user to secure a transaction.

To this end, one possible attack consists of the insertion, between the keys and the printed circuit board, more precisely between the actuator and the dome, of a "spy" element (for example a flexible printed circuit board, microswitches or again Hall effect detectors) that retrieve the information on pressure on a key to deduce, from this information, the digits entered by the user.

Another possible attack consists of the insertion of a film and wires above the keypad to intercept the keys entered by the user. To that end, the fraudulent individual needs to damage/machine the surface of the light guide (or completely replace the light guide) implemented in the electronic payment terminal, by scratching it at certain places so as to be able to glue the spy film thereon. This deterioration does not necessarily require the removal of the light guide from the electronic payment terminal.

Certain approaches have therefore been proposed to try and limit these attacks, for example by greatly reducing the size of the keypad to make it more difficult to insert these spy elements, or again by implementing techniques to detect the dismantling of the keypad, this dismantling being often necessary to insert these spy elements.

Other approaches consist of the addition to the electronic payment terminal or the independent keypad of dummy keys exerting permanent pressure and thus enabling the detection of the removal of the keypad. This solution therefore requires the addition of compressed parts and causes permanent pressure in the products, inducing more rigid mechanical structures and therefore having an impact on the design.

Other approaches are based on the addition of a protection circuit in the form of a lattice.

However, these solutions require major modifications in the architecture of the keypad by the addition of detection modules for example, and do not respond to the observed scale of the fraud as the spy elements, in turn, become ever smaller and their techniques of insertion become ever more discreet. In addition, these solutions are highly sensitive to climatic constraints causing for example a corrosion of contacts, migration of chemical compounds during the lifetime of the product etc.

Besides, it is also difficult to counter attacks consisting in spying on the data of a smartcard when it is inserted into an electronic payment terminal or an independent reader attached to an electronic payment terminal, for example when these attacks are carried out by the insertion of a magnetic read head in the smartcard insertion slot.

There is therefore a need for a technique for securing the electronic devices used for to enter or read sensitive data, this technique making it possible to counter attacks in which one or more spying elements are inserted while at the same time being simple and costing little to implement.

3. SUMMARY OF THE INVENTION

The invention proposes a novel solution that does not have all these drawbacks of the prior art, in the form of a system for detecting intrusion in an electronic device.

According to the invention, the system comprises at least one optical sensor connected to at least one security module of the electronic device, the optical sensor and the security module being configured to detect a variation in light intensity measured by the optical sensor as compared with a reference light intensity associated with at least one pre-determined light source inside the electronic device, the variation in light intensity representing a risk of intrusion into the electronic device.

In addition, the electronic device comprises means for transmitting at least one random on/off signal or a random variation signal intended for the light source, and the optical detection implemented by the optical sensor and the security module takes account of the random signal transmitted.

Thus, the invention proposes a novel and inventive system for the detection of attempts at intrusion (for example by the insertion of a spy element or the machining of a part such as the light guide of the keypad) in an electronic device such as for example an electronic payment terminal, an independent secured keypad (that can be attached to an electronic payment terminal or any other electronic device, for example for a pay television application), an independent, secured (smartcard or stripe) card reader (capable of being attached to an electronic payment terminal or any other electronic device), working by optical detection.

To this end, the invention in its different embodiments implements one or more optical sensors enabling the measurement of the variations in light intensity in the secured electronic device compared with a reference light intensity associated with at least one pre-determined light source.

Thus, the addition of this optical sensor or sensors at strategic places within the electronic device, in association with one or more light sources inside the electronic device, enables the detection of several types of intrusion that have the effect of modifying the light intensity (and more particularly the luminance measured by this sensor or these sensors) in the electronic device, for example by the shifting, addition or damaging of the components of the electronic device.

For example, an intrusion in which the surface of the light guide of a keypad is modified, or in which the light guide is shifted, can thus be detected, just like an intrusion in which a read head is added at the insertion slot for a memory card according to the positioning of the optical sensor or sensors To this end, one or more sensors are therefore added:
- either in association with one or more light sources already existing in the electronic device such as diodes used for the back-lighting of a keypad via a light guide or for the back-lighting of the insertion slot of the memory card,
- or in association with one or more light sources not present in the electronic device but added specifically to implement the invention.

Since this sensor or the sensors are connected to the security module of the electronic device, they can transmit their measurements of light intensity, for example their measurements of luminance, in the electronic device to this security module and thus enable the detection of unexpected or incongruent variations in this measured light intensity.

Thus, according to the different embodiments of the invention, its implementation consists solely of the addition of optical sensors, or even of associated light sources when they are not already present in the electronic device, and the programming of the security module so that it processes the signals received by the sensors and can detect a risk of intrusion in the electronic device.

The invention can therefore be applied to the securing of any electronic device comprising a security module, such as an electronic payment terminal, an independent keypad or card reader etc.

For example, the sensor belongs to the group comprising at least:
- one photo-resistor;
- one photodiode;
- one CCD type sensor.

According to one particular characteristic, the pre-determined light source corresponds to a light-emitting diode (LED).

Thus, the invention according to this embodiment implements at least one optical sensor capable of detecting variations in light intensity associated with at least one light-emitting diode type of light source.

Indeed, this embodiment makes it possible especially to use the light sources of this type, already implanted in the electronic device to be secured, for another function, such as for example to back-light the keypad through a light guide. The optical sensors strategically placed in the electronic device therefore enable especially the detection of intrusions aimed at shifting, replacing or damaging/machining the light guide to insert one or more spy elements above the keys of the keypad to spy on the digits of a confidential code entered by a user.

According this same principle, this embodiment also enables the use of the light sources of this type already implanted in the electronic devices to be secured to ensure the back-lighting of the insertion slot of a memory card, to detect especially intrusions aimed at the addition, at this level, of a read head to explore the magnetic track of the card once inserted and to extract sensitive data therefrom.

Finally, if the electronic device to be secured does not have back-lighting means, the addition of light sources of the light-emitting diode type has the advantage of costing little and being compact for optimal implementation of the invention.

This embodiment can be applied not only to any electronic payment terminal but also to any electronic device capable of being attached to an electronic payment terminal such as for example a keypad or an independent and secured card reader, as well as any electronic device that can be attached to another electronic device (a keypad attached to a television set or to an interactive terminal etc.) and requiring a processing of the secured data.

According to one particular aspect of the invention, the optical sensor is soldered to a printed circuit board of said electronic device and connected to said security module via an analog-digital convertor that can physical form part of the security module of said electronic device. The analog-digital convertor is for example used for photo-resistor type sensors that do not send out any digital signal.

Thus, according to this embodiment of the invention, the optical sensor or sensors are soldered to the printed circuit of the electronic device, among the other components, and connected to the security module of the electronic device via an analog-digital convertor enabling the processing of the signals received by the optical sensor or sensors.

According to one particular characteristic of the invention, the optical sensor is implanted in the electronic device at a location chosen on the basis of at least one criterion belonging to the group comprising:
- a contribution of at least one pre-determined light source inside the electronic device;
- a gradient of luminance around the locations;
- a contribution from a light source external to the electronic device.

Thus, according to this embodiment of the invention, the location of the optical sensor or sensors responds to a particular strategy of detection making it possible to obtain a compromise between an optimal detection of intrusion and a minimizing of false detection alerts.

For example, should the light sources associated with the optical sensors correspond to the LEDs used for back-lighting the keypad, via a light guide, a strategy of choosing locations of the sensors will consist in taking account of the contribution of each LED.

Indeed, a judicious positioning of a sensor corresponds for example to a place where it is not "subjected" to the main contribution of a single LED, so that a variation in light intensity measured by this sensor can be easily analyzed as a change in context for the LED in question (the machining or shifting of the light guide above this LED for example). If such a location is not possible, then it is appropriate for example to place a sensor at a place where it is subjected to a "balanced" contribution from several LEDs (50% of light intensity due to each of the two LEDs close to the sensor). One strategy can also consist in using several sensors at different locations to "balance" the contributions of several LEDs and thus be able to analyze variations in light intensity proper to each LED.

According to another example, it is possible to make an optical simulation of luminance by analyzing the luminance measured by a plane optical sensor placed in the middle of the light guide, throughout its surface so as to obtain a simulation of the gradient of luminance at each position of the light guide. The choice of the location of the sensor or sensors then depends on this gradient of luminance, it being further known that the higher the gradient of luminance at a place, the more sensitive will the optical sensor at this place be to the variations of luminance and to the motions of the light guide for example. These locations of high gradient of luminance therefore need to be avoided.

Finally, it is important to take account as far as possible of the influence of light external to the electronic device to be secured that is capable of varying without being related to any sort of intrusion whatsoever into the device.

According to one particular aspect of the invention, the system of detection also comprises an infrared filter or ultraviolet filter applied to at least one part of the surface to be secured of the electronic device.

Thus, such an infrared filter or ultraviolet filter, applied for example to the entire keypad or to a part of the keypad of an electronic payment terminal, limits or even completely removes the influence of the light external to the terminal. At the same time, it does not impair the performance of the back-lighting of the keypad for the terminal user. To this end, this filter is associated for example with light sources and only one infrared light detector, dissociated from the back-lighting.

The invention also relates to a method for detecting an intrusion into an electronic device implementing a system of detection as described here above. According to the invention, such a method of detection comprises a step of optical detection of an intrusion when at least one absolute value of a difference between:

a light intensity measured by at least one optical sensor and
a reference light intensity exceeds a pre-determined threshold.

Thus, according to this embodiment, an intrusion is detected in the electronic device thus secured when a variation in light intensity measured by at least one optical sensor exceeds a pre-determined threshold that can depend for example on:

the optical sensor in question;
the time lapse between two measurements (indeed, a fast variation in luminance means that there has very probably been an intrusion or an attempted intrusion);
a tolerance taking account of criteria such the ageing of the LED associated with the sensor, dust accumulation in the electronic device etc.

In particular, the step of optical detection also takes account of a result of an additional measurement of temperature and/or light intensity coming from another sensor.

Thus, when a temperature control is furthermore made for example in the electronic device, also for reasons of security, these temperature variations measured can be correlated with the variations of intensity measured according to the different embodiments of the invention.

According to one particular characteristic of the invention, the method comprises a step for the transmission of at least one random on/off signal or a random variation intended for at least one of the light sources inside the electronic device and the step of optical detection takes account of the random signal transmitted.

Thus, according to one first alternative embodiment, random signals (long/short on/off alternations for example or, instead of 0 or 1 illumination values, the use of intermediate values) known only to the processor of the security module of the electronic device can be sent to the LEDs and the correspondence with the signals received by the sensor can thus be verified. This makes it possible especially to prevent a hacker from dazzling the sensor gradually and then "shunting" the sensor by means of an equivalent resistor or again spying on the signal of the photo-resistor to replace it by an equivalent signal.

According to another variant, it is planned to illuminate the LEDs alternatively, leading not only to alternations of on and off operations but also to different levels of light intensity for each sensor, when they depend on a contribution from several LEDs especially.

According to one particular embodiment of the invention, the method of detection comprises a step for generating an alarm when an intrusion is detected during the step of optical detection, the alarm being of a type belonging to the group comprising at least:

the passage of the electronic device into "infringement" mode;
the display of an alarm message on the electronic device;
a combination of the above types of alarms.

Thus, when a possible intrusion is detected, the general alarm can consist of a message on the electronic device thus secured, which can no longer work "normally" (for example if it is an electronic payment terminal or an accessory attached to an electronic payment terminal, then it is no longer possible for any transaction to be performed). Then, such an electronic device must compulsorily be returned to the factory, following current known techniques for the securing of electronic payment terminals, such as for example the other techniques used to detect opening and fraud.

For example, the method comprises a step for memorizing at least one value of light intensity measured by at least one optical sensor.

In particular, the method of detection comprises a step for comparing at least one value of light intensity measured by at least one sensor with at least one preliminarily memorized value of light intensity.

Thus, this embodiment stipulates that the last measurements of intensity of the optical sensors before the electronic payment terminal is turned off should be recorded so that they can be compared with the first measurements of the optical sensors performed during the restarting of the electronic device.

In this way, a major difference or discrepancy between the measurements of intensity made before turning the device and after restarting it gives rise to an alert because it is then highly probable that the electronic device will have undergone an attempted attack and that for example the light guide is damaged. Indeed, attacks on "pucks" (or dummy keys, safety pins, detectors) make it necessary to machine the light guide, and the positioning of a spy element in the space of the light guide requires the machining or the removal of the light guide.

In addition, this storage of pre-measured values of light intensity ensures high reliability of detection in making it possible to take account of criteria of wear and tear of the components of the electronic device for example, so as not to detect any intrusion in the event of low variations or slow variations in the light intensity measured.

For example, the method of detection is activated by an event belonging to the group comprising at least:

the activation of the measurements of security of the electronic device;
each action turning the electronic device off;
each restarting of the electronic device;
periodic events;
before a secured transaction;
a combination of at least two of the above events.

The invention also pertains to an electronic device comprising at least one system for detecting an intrusion as described here above for implementing the method of detecting intrusion as described here above. Such an electronic device is for example an electronic payment terminal, an independent keypad, an independent card reader or any electronic device responding to the same problems and issues related to securing.

The invention also concerns a computer program downloadable from a communications network and/or stored on a medium readable by a computer and/or executable by a microprocessor, comprising program code instructions for executing a method of detection as described here above when it is executed on a processor.

The invention finally relates to a recording medium readable by a computer on which there is recorded a computer program comprising instructions for the execution of the steps of the method of detection as described here above.

4. FIGURES

Other features and advantages of the invention shall appear more clearly from the following description of a preferred embodiment, given by way of a simple illustratory and non-exhaustive example and from the appended figures, of which.

5. DESCRIPTION 5.1. General Principle

The general principle of the invention consists of the use of optical sensors to detect a potential intrusion in an electronic device through the detection of incongruent variations in light intensity in the electronic device in question.

To this end, the invention, according to its different embodiments, implements at least one optical sensor connected to the security module of the electronic device, configured to detect incongruent variations in light intensity compared with a light intensity associated with at least one light source inside the electronic device.

Such an electronic device corresponds for example to an electronic payment terminal or to a payment accessory (an independent keypad or card reader attached to an electronic payment terminal), or again an independent secured keypad that can for example be attached to another device in the context of a pay television application.

Here below, the description shall strive to describe the invention for an electronic payment terminal but it is understood that the invention is not limited to such a device and can be applied especially to any electronic device facing the same set of problems and issues related to securing and having to be subjected to special security measures related especially to the sensitive nature of the data processed by this electronic device, such as for example data entered on a keypad (a confidential code for an electronic financial transaction or for a secured connection or secured access to a building or a service) or data read by card (a smartcard or a magnetic stripe card) through a card reader.

Thus, the invention, according to its different embodiments, makes advantageous use of the following observation: the most frequent intrusions presently observed in electronic payment terminals, made through their keypad or a keypad attached thereto, modify the pathway of the light rays within the terminal (or more particularly the keypad), because of the deterioration, the shifting, the withdrawal or even the addition of components in the terminal (for example the presence of glue on an optical surface considerably changes the behavior of the light rays). An optical detection of an intrusion can therefore be implemented simply and at low cost by the addition of optical sensors.

In addition, most present-day payment terminals enjoy the benefit of a function for improving the ergonomy of the keypad through a back-lighting process provided both by a plurality of light sources implanted in the printed circuit board of the terminal and a light guide integrated into the keyboard of the terminal. Certain present-day payment terminals also benefit from an equivalent function for improving the ergonomy of the smartcard reader through a back-lighting of the smartcard insertion slot, provided by at least one light source implanted on the printed circuit board of the terminal in proximity to this slot. Thus, light sources inside the terminal are most frequently already present to fulfill these functions of back lighting and can be associated with the optical sensors of the invention to detect intrusions through the detection of incongruent variations of light intensity in comparison with a reference light intensity pertaining to at least one light source inside the terminal.

Finally, we shall more particularly describe an embodiment based on the detection of variations of measurements of luminance carried out by one or more of optical sensors, although "light intensity" is the term most frequently used. Thus, the physical quantity or magnitude measured by the sensor or sensors according to the different embodiments of the invention can correspond to a luminance or any other quantity used to obtain the same results of optical detection.

Thus, the invention in its different embodiments overcomes drawbacks such as ageing due to the contacts, since the sensors and light sources used do not require contact (apart from the contacts on the printed circuit of the electronic payment terminal) to implement optical detection.

In its different embodiments, the invention also makes it possible to complement or even do away with the need to screen-print flexible printed circuit (FPCs) and to have compressed parts as in certain prior-art techniques.

Besides, the invention in its different embodiments also reduces the number of security dummy keys to be implemented and therefore reduces the constant pressure applied to the device, since optical detection especially reinforces the level of security.

5.2. Description of One Embodiment 5.2.1 Example of a System for Detecting Intrusions Referring now to FIG. 1, we shall describe a first embodiment of the invention in the form of a system for detecting intrusions comprising, for example, two optical sensors C1 and C2 associated with three light sources SL1, SL2 and SL3. This system for detecting intrusions is for example implanted in the printed circuit board of an electronic payment terminal, an independent secured keypad or a secured and independent card reader (smartcard reader or magnetic stripe reader).

Figures 1, 3:
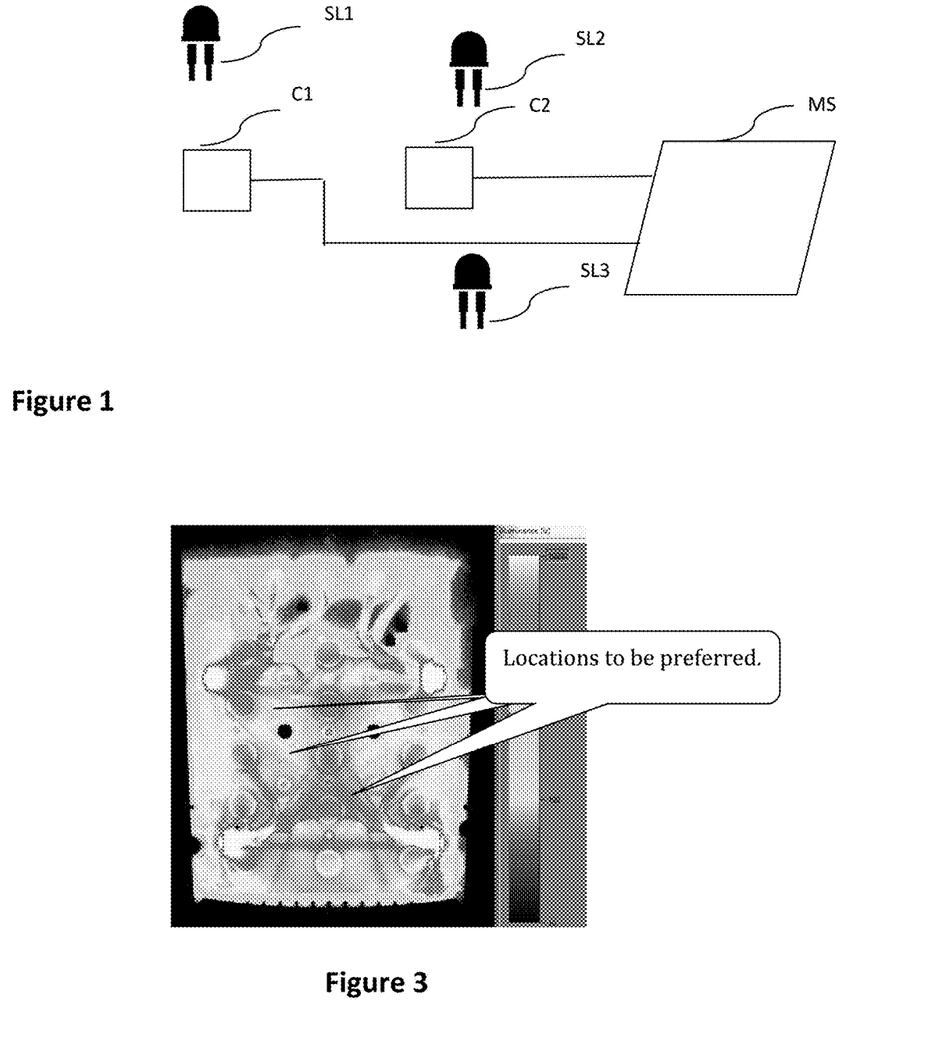
FIG. 1 presents an example of a diagram of a system for detecting intrusions according to one particular embodiment of the invention.
FIG. 3 presents an example of optical simulation of luminance measured by a plane optical sensor for a light guide as illustrated in FIG. 2, according to one particular embodiment of the invention.

The two optical sensors are connected to the security module MS in such a way that the signals that they receive can be processed and analyzed by the security module MS to detect possible intrusions into the electronic payment terminal and also adjust the values as a function of the events (ageing of the LEDs, dust accumulation etc.).

For example, the two optical sensors are photo-resistors, emitting resistance proportional to the signal received. This analog value is therefore then transmitted to the microprocessor of the security module via an analog-digital convertor for example.

It is also possible to use photodiode type sensors.

The third type of sensor is a camera type sensor or CCD (Charge-Coupled Device) which, in addition to information on "intensity", can complement this information by a "wavelength" type of information, thus making it less sensitive to external light. This sensor also has the advantage of being capable of sending out a digital signal thus removing the need to add an analog-digital convertor.

Finally, it is possible to use any other light sensor that will make it possible to send back information on light intensity.

The three light sources SL1 to SL3 for their part correspond for example to light-emitting diodes implanted in the printed circuit board of the electronic payment terminal to provide back-lighting of the keyboard via the joint use of a light guide.

Figure 2:
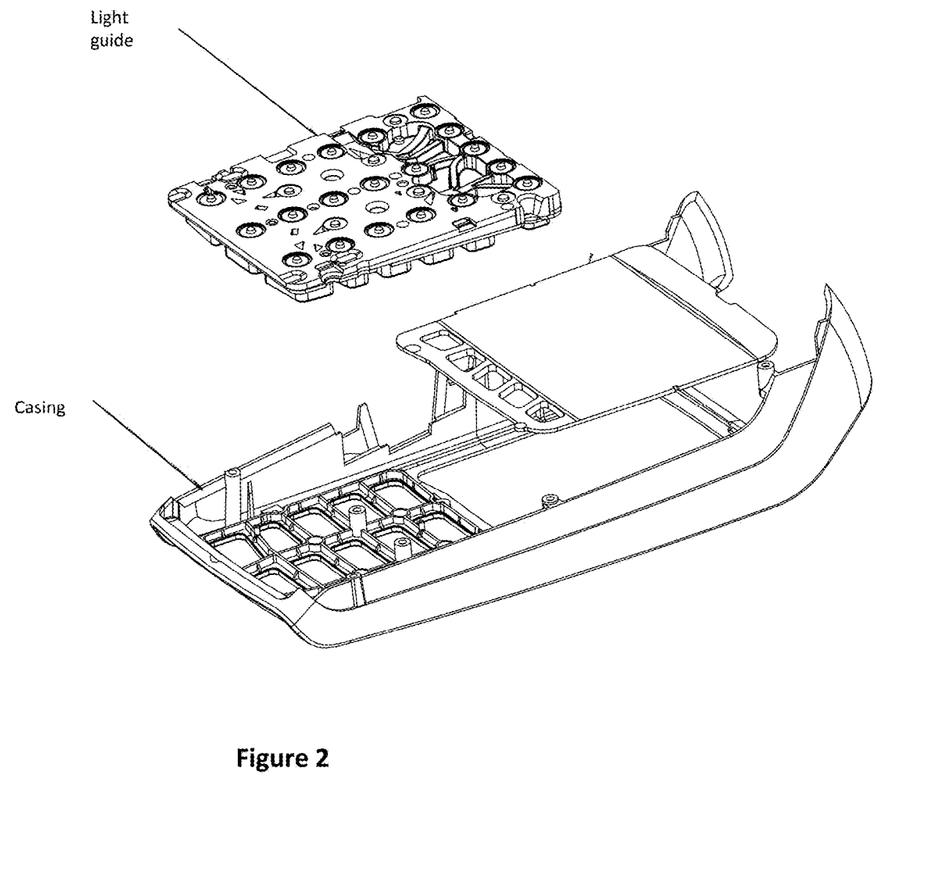
FIG. 2 presents an example of a light guide implemented in an electronic payment terminal comprising a system as illustrated in FIG. 1, according to one particular embodiment of the invention.

For example, such a light guide is illustrated in FIG. 2, beneath a casing of an electronic payment terminal. Such a light guide is intended for the optimal propagation of light emitted by the diodes, in all the keys of the keyboard, so as to back-light the keyboard ergonomically and uniformly, for a user.

FIG. 3 provides an illustration (in gray levels) of an optical simulation depicting the density of light rays in a light guide (i.e. luminance as an optical variable or quantity). To obtain such a simulation, a plane optical "virtual sensor" is positioned beneath the light guide, on the entire surface or on a part of it, and measures the light rays that pass through it, in both senses (from the interior of the electronic payment terminal to the exterior and vice versa).

Such a simulation makes it possible, in its traditional use, to simulate the illumination of the keys to work the shapes of the light guide and optimize the homogeneity of the lighting for the user.

In this case of use, a simulation will also enable the judicious/strategic choice of the locations of the optical sensors so that the optical detection of an intrusion is optimal (compromise between a high rate of detection of real intrusions and a low rate of false detections).

Thus, the sensor or sensors are placed in such a way that:
- the shift relative to the light guide and the sensor (for example at the time of the assembly of the electronic payment terminal or when the electronic payment terminal suffers a fall) is imperceptible. To this end, it is necessary for example to choose a location where the gradient of luminance (on the simulation) is not too high on a range of a few millimeters. For example, FIG. 3 identifies these locations to be preferred;
- when possible, each LED contributes to the illumination of each sensor. For example, in FIG. 1, it can be assumed that the optical sensor C1 is chiefly sensitive to the light intensity emitted by the light source SL alone;
- when it is not possible for each LED to contribute to the illumination of each sensor with little influence from the external light, a sensor should be sensitive to a balanced contribution from several light sources. For example, in FIG. 1, it can be assumed that the optical sensor C2 is sensitive to the light intensity emitted by the two light sources SL2 and SL3, in equal parts;
- the influence of the external light is minimized, this external light possibly varying without this being in any way equivalent to an intrusion into the electronic payment terminal. To this end, it is possible to apply, to the entire keypad of the terminal or to a part of it, an infrared filter enabling the limitation or even the complete removal of the influence of the light external to the terminal, while at the same time not impairing the performance of the back-lighting of the keypad for the terminal user. In this case, beneath the infrared filter, it is also possible to add a specific infrared source and one or more infrared detectors so as to be totally insulated from the exterior. The measurement could be made by turning off the light sources that illuminate the keypad. To limit the influence of the external light, a sensor can measure the external light and take this measurement into account in the computations of comparison Other elements can of course be considered for the positioning of the optical sensors, the goal being that the measurements of luminance should enable optimal detection of an intrusion into the electronic payment terminal.

The fact of having several sensors can also enable a verification: if a value given by one sensor drops significantly whereas the value of another sensor, supposed to measure same light source, has not dropped, this suggests an attempted fraud.

Similarly, if the electronic payment terminal to be secured does not have any internal light sources (for example because it does not offer the function of back-lighting the keypad or the smartcard insertion slot), light sources specific to the invention are added, in association with the optical sensors implemented.

Finally, the choice of location of the optical sensor or sensors makes it possible to set the parameters of the optical detection method to take into account the specific context of implementation of the optical detection system. A more precise description shall now be provided of the implementation of the optical detection method according to this embodiment of the invention.

According to other alternative embodiments, a light source can correspond to an incandescent source, a neon light etc.

5.2.2 Example of a Method for Detecting Intrusions

Figures 4, 6:
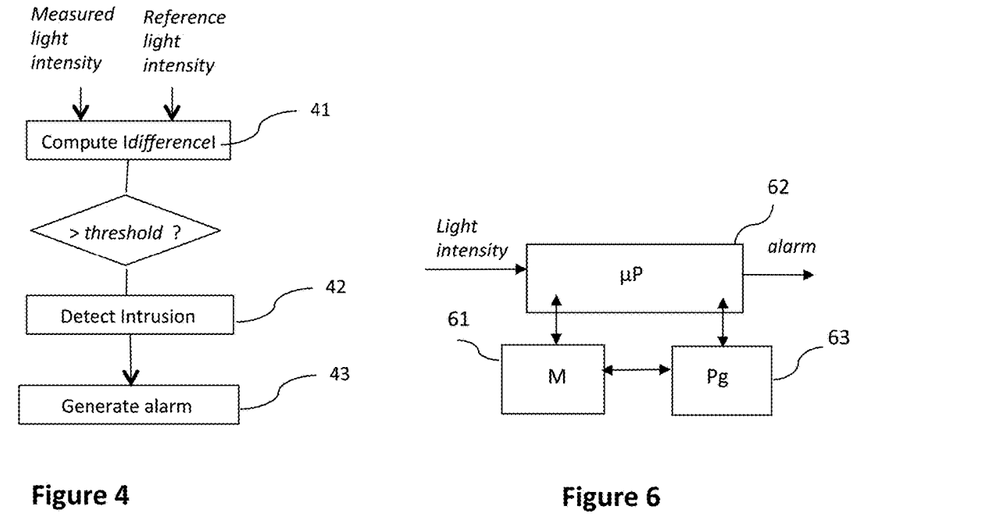
FIG. 4 illustrates the main steps of the method for detecting intrusions, according to one embodiment of the invention.
FIGS. 5 and 6 illustrate two examples of a simplified architecture of a system or module for detecting intrusions according to one particular embodiment of the invention.

FIG. 4 illustrates the main steps of this method for a given optical sensor, it being known that the method of optical detection can be implemented whatever the number of optical sensors used, and can correlate the results obtained for each optical sensor so as to optimize the detection of intrusion. These main steps are for example implemented by the security module of the electronic payment terminal or an associated module, using signals received and transmitted by the optical sensor or sensors.

The method of detection therefore comprises a first step 41 for computing an absolute value of difference between a value of light intensity or luminance measured by an optical sensor and a reference value of light intensity or luminance. This reference luminance can be associated with one or more light sources and can take account of the influence of the external light (for example the use of an additional sensor measuring the external light) or of yet other criteria.

In addition, at each measurement, the reference intensity can be recomputed either by directly taking the last value measured or by using the n last values measured with their time stamp, and then by smoothing the result with a moving or "sliding" average so as to be able for example to take account of criteria such as ageing or dust accumulation of the light guide or the LEDs. Thus, algorithms of comparison taking account of measurements of intensity already made are implemented in order to ensure the reliability of the detection of intrusion.

A comparison with a pre-determined threshold is then implemented so as to determine whether or not the computed variation of luminance exceeds this threshold.

If the threshold is exceeded, then an intrusion is detected during a step 42 for detecting an intrusion and is followed by a step 43 for generating an alarm.

According to alternative embodiments, the result of the comparison is interpreted in different ways, for example when it has to be correlated with other parameters such as the result of a temperature control, implemented distinctly, the result of the method of detection pertaining to one or more other sensors, a time-related parameter enabling the detection only of fast variations in luminance and the discarding of slow variations that could be attributed rather to the normal operation of an electronic payment terminal (ageing or dust accumulation in the light guide or LEDs).

Similarly, the comparison threshold making it possible to detect the fact that there has or has not been a possible intrusion into the electronic payment terminal depends on a plurality of parameters such as the location of the sensor or the percentage of contributions from the associated light sources.

Besides, the method of detection according to this embodiment of the invention can be applied for example to the activation of security measures for the electronic payment terminal so as to optimize the security of the electronic payment terminal when it is in use.

Similarly, the method can be implemented each time the terminal is turned off and each time the terminal is restarted so as to be able to detect mainly intrusions that have taken place outside the periods of use of the electronic payment terminal. Indeed, the intrusions that require dismantling of an electronic payment terminal are rarely possible when the terminal is being used and often take place after this electronic payment terminal has been stolen and returned to be put back into service once the intrusion has been made. The method of detection according to this embodiment therefore provides for the memorizing, whenever the electronic payment terminal is turned off, of the measurements of luminance made by the sensor or sensors so as to compare them with the first measurements made when the electronic payment terminal is restarted.

Finally, the method of detection can be executed periodically, when the electronic payment terminal is in use, in order to detect intrusions even when the electronic payment terminal is on. Once the intrusion is detected, according to the embodiment described here above, an alarm is therefore generated so as to take the terminal into "infringement" mode. For example, the alarm generated can consist of a message on the terminal, on which it will no longer be possible to make any transaction. Thereafter, such a terminal must necessarily be returned to the plant, following the known techniques presently used for securing electronic payment terminals, such as for example other techniques used to detect opening and fraud.

5.3. Alternative Embodiments

According to certain alternative embodiments, the measurements of luminance made by the optical sensors are subjected to deliberate variations in the illumination of the associated light sources so as to secure the optical detection according to the invention.

For example, according to a first alternative embodiment, random signals (alternations of "long/short" on and off operations for example) that are known only to the processor of the security module of the electronic payment terminal can be sent to the LEDs and the correspondence with the signals received by the sensor can thus be verified. This makes it possible especially to prevent a hacker from gradually dazzling the sensor by the use of an additional light source and then "shunting" the sensor by means of an equivalent resistor, or again spying on the signal sent by the photoresistor to replace it by an equivalent signal. Indeed, since this sent signal differs depending on the non-predictive random signals sent by the LEDs, it cannot be "simulated".

According to another alternative embodiment, it is planned to illuminate the LEDs alternatively, leading not only to alternating on/off operations but also to different levels of light intensity for each sensor, especially when they depend on a contribution from several LEDs. This is especially useful if several versions of a light guide are used in parallel. The distribution of the light is then different according to the light guide and it will be difficult for a "spy" to replace it by another light guide (minimum difference of definition, dust accumulation, difference etc.).

5.4. Simplified Architecture of a Module for Detecting Intrusion

Figure 5:
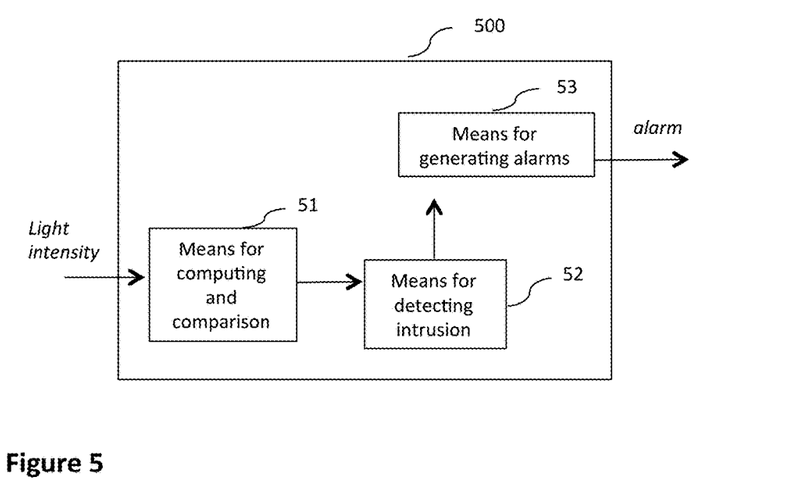

Referring to FIGS. 5 and 6, we describe an example of a system of intrusion detection comprising means for executing the method described here above (especially means for computing and comparison 51, means for detecting intrusion 52 and means for generating alarms 53).

Thus, as illustrated in FIG. 5, such a system 500 or module 500 integrated for example with the printed circuit board of an electronic device, comprises at least one optical sensor (C1) connected to at least one security module (MS) of the electronic device, the optical sensor and the security module being configured to detect a variation in light intensity measured by the optical sensor relative to a reference light intensity associated with at least one pre-determined light source (SL1) inside the electronic device, the variation in light intensity representing a risk of intrusion into the electronic device.

We shall now describe a system 500 also called a detection module, with reference to FIG. 6.

For example, the module comprises a memory 61 constituted by a buffer memory, a processing unit 62 equipped for example with a microprocessor and driven by the computer program 63 implementing a method for detecting intrusion according to the different embodiments described here above.

At initialization, the code instruction of the computer program 63 are for example loaded into a memory and then executed by the processor of the processing unit 62. The processing unit 62 inputs for example a measured value of light intensity (for example a measurement of luminance) and at least one reference value of light intensity (for example a measurement of luminance). The microprocessor of the processing unit 62 implements the steps of the method for detecting intrusion according to the instructions of the computer program 63 to generate an alarm.

It must be noted that the values of intensity measured as well as the reference values are stored in a secured memory zone in order to prevent a "spy" from being able to exploit this data.

Finally, all the characteristics of the invention according to its different embodiments of the system for detecting an intrusion, of the method for detecting an intrusion or of the device for detecting an intrusion can be taken separately or in combination.

The invention claimed is:

1. An electronic device comprising:
at least one security module, a keypad, an insertion slot for a card and at least one pre-determined light source inside said electronic device; and a system for detecting intrusion in the electronic device, wherein the system comprises:
at least one optical sensor connected to the at least one security module of the electronic device, said at least one optical sensor and said security module being configured to detect a variation in light intensity measured by said at least one optical sensor as compared with a reference light intensity associated with the at least one pre-determined light source inside said electronic device, said at least one pre-determined light source carrying out back-lighting of the keypad and/or of the insertion slot for the card of said electronic device, and said variation in light intensity representing a risk of intrusion into said electronic device,
and wherein said electronic device comprises a transmitter, which transmits at least one random on/off signal or a random variation signal for at least said pre-determined light source, the variation in light intensity being measured by said at least one optical sensor and said security module by taking account of the at least one random on/off signal transmitted.

2. The electronic device according to claim 1, wherein said at least one optical sensor belongs to the group consisting of:
a photo-resistor;
a photodiode;
a CCD sensor.

3. The electronic device according to claim 1, wherein said at least one pre-determined light source corresponds to a light-emitting diode.

4. The electronic device according to claim 1, wherein said at least one optical sensor is implanted in said electronic device at a location chosen on the basis of at least one criterion belonging to the group consisting of:
a contribution of at least one pre-determined light source inside said electronic device;
a gradient of luminance around said location;
a contribution from a light source external to said electronic device.

5. The electronic device according to claim 1, further comprising an infrared filter or ultraviolet filter applied to at least one part of a surface to be secured of said electronic device.

6. A method for detecting an intrusion into an electronic device, said electronic device including at least one security module, a keypad and an insertion slot for a card, wherein the method comprises:
optically detecting an intrusion when at least one absolute value of a difference between:
a light intensity measured by at least one optical sensor connected to the at least one security module of the electronic device and
a reference light intensity associated with at least one pre-determined light source inside said electronic device
exceeds a pre-determined threshold,
wherein said optically detecting comprises a detection, by said at least one optical sensor and said security module, of a variation in light intensity measured by said at least one optical sensor as compared with said reference light intensity associated with the at least one pre-determined light source inside said electronic device, said at least one pre-determined light source carrying out back-lighting of the keypad and/or of the insertion slot for the card of said electronic device, and said variation in light intensity representing a risk of intrusion into said electronic device; and
transmitting at least one random on/off signal or a random variation for at least one of the at least one pre-determined light source inside said electronic device, wherein said optically detecting takes account of said at least one random on/off signal transmitted.

7. The method for detecting an intrusion according to claim 6, wherein said optically detecting also takes account of a result of an additional measurement of temperature and/or light intensity coming from another sensor.

8. The method for detecting an intrusion according to claim 6, further comprising generating an alarm when an intrusion is detected during said detection, said alarm being of a type belonging to the group consisting of:
passage of said electronic device into "infringement" mode;
display of an alarm message on said electronic device;
a combination of the above types of alarms.

9. The method for detecting an intrusion according to claim 6, further comprising memorizing at least one value of light intensity measured by the at least one optical sensor.

10. The method for detecting an intrusion according to claim 6, further comprising comparing at least one value of light intensity measured by the at least one optical sensor with at least one preliminarily memorized value of light intensity.

11. The method for detecting an intrusion according to claim 6, wherein the method is activated by an event belonging to the group consisting of:
activation of measurements of security of said electronic device;
each action of turning said electronic device off;
each restarting of said electronic device;
periodic events;
before a secured transaction;
a combination of at least two of the above events.

12. A non-transitory computer-readable medium comprising instructions stored thereon for implementing a method for detecting an intrusion into an electronic device when the instructions are executed by a processor, wherein the electronic device comprises at least one security module, a keypad and an insertion slot for a card, and wherein the method comprises:
optically detecting an intrusion when at least one absolute value of a difference between:
a light intensity measured by at least one optical sensor connected to the at least one security module of the electronic device and
a reference light intensity associated with at least one pre-determined light source inside said electronic device exceeds a pre-determined threshold;
wherein said optically detecting comprises a detection, by said at least one optical sensor and said security module, of a variation in light intensity measured by said at least one optical sensor as compared with said reference light intensity associated with the at least one pre-determined light source inside said electronic device, said at least one pre-determined light source carrying out back-lighting of the keypad and/or of the insertion slot for the card of said electronic device, and said variation in light intensity representing a risk of intrusion into said electronic device; and
transmitting at least one random on/off signal or a random variation for at least one of the at least one pre-determined light source inside said electronic device, wherein said detection takes account of said at least one random on/off signal transmitted.

\* \* \* \* \*